No. 654,708. Patented July 31, 1900.
F. BRUNE.
PUNCHING AND RIVETING MACHINE.
(Application filed Jan. 2, 1900.)
(No Model.) 6 Sheets—Sheet 1.

No. 654,708. Patented July 31, 1900.
F. BRUNE.
PUNCHING AND RIVETING MACHINE.
(Application filed Jan. 2, 1900.)
(No Model.) 6 Sheets—Sheet 3.

Witnesses.
O. N. Keeney.
Anna V. Faust.

Inventor.
Friedrich Brune
By Benedict & Morsell
Attorneys.

THE NORRIS PETERS CO., PHOTO-LITHO., WASHINGTON, D. C.

No. 654,708. Patented July 31, 1900.
F. BRUNE.
PUNCHING AND RIVETING MACHINE.
(Application filed Jan. 2, 1900.)
(No Model.) 6 Sheets—Sheet 4.

Witnesses:
Inventor:
Friedrich Brune
By Benedict & Morsell
Attorneys.

THE NORRIS PETERS CO., PHOTO-LITHO., WASHINGTON, D. C.

No. 654,708. Patented July 31, 1900.
F. BRUNE.
PUNCHING AND RIVETING MACHINE.
(Application filed Jan. 2, 1900.)
(No Model.) 6 Sheets—Sheet 5.

Witnesses.
Inventor.
Friedrich Brune
By Benedict & Morsell
Attorneys.

No. 654,708. Patented July 31, 1900.
F. BRUNE.
PUNCHING AND RIVETING MACHINE.
(Application filed Jan. 2, 1900.)
(No Model.) 6 Sheets—Sheet 6.

Witnesses.
O. H. Keeney
Anna V. Faust.

Inventor.
Friedrich Brune
By Benedict & Morsell
Attorneys.

THE NORRIS PETERS CO., PHOTO-LITHO., WASHINGTON, D. C.

UNITED STATES PATENT OFFICE.

FRIEDRICH BRUNE, OF MILWAUKEE, WISCONSIN.

PUNCHING AND RIVETING MACHINE.

SPECIFICATION forming part of Letters Patent No. 654,708, dated July 31, 1900.

Application filed January 2, 1900. Serial No. 36. (No model.)

*To all whom it may concern:*

Be it known that I, FRIEDRICH BRUNE, of Milwaukee, in the county of Milwaukee and State of Wisconsin, have invented a new and useful Improvement in Punching and Riveting Machines, of which the following is a description, reference being had to the accompanying drawings, which are a part of this specification.

My improvements in punching and riveting machines are illustrated herewith in a machine adapted for securing metal bail-ears to tin or other metal pails. The machine is adapted for a variety of work of an analogous character.

The invention consists of the machine, its parts, and combinations of parts, as herein described and claimed, or the equivalents thereof.

In the drawings, Fig. 24 is a face or end view of the clutch member opposite and complementary to the member shown in Fig. 20, the shaft being in section and the rim of the fly-wheel to which this member of the clutch is secured being broken away.

Figures 1, 19:
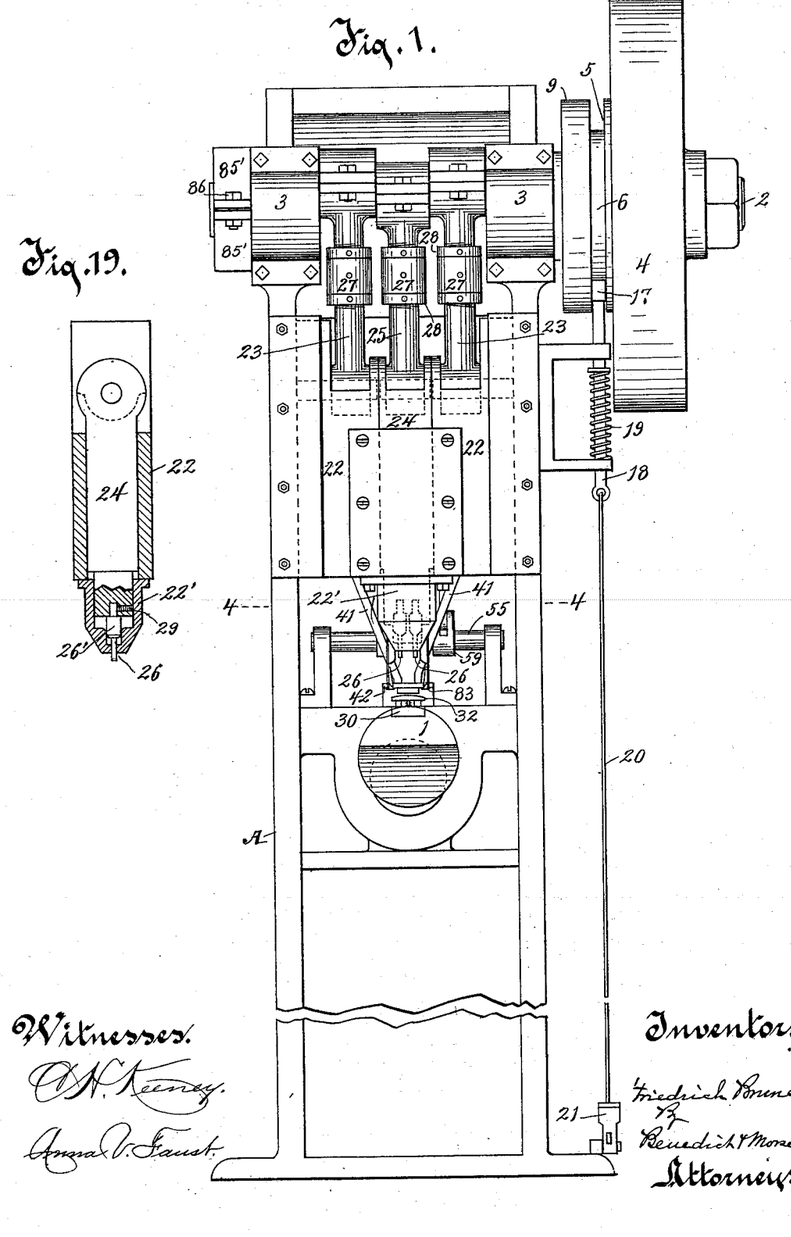
Figure 1 is a front elevation of a machine embodying my improvements, parts being broken away for convenience of illustration.
Fig. 19 is a vertical section of the plunger-die and the riveting-set.

In the drawings, A is a frame of suitable size and form to support thereon the mechanism and apparatus involved in my invention. An anvil 1 is secured to and projects from the frame. The anvil is adapted to support the rivet and the pail or utensil, (indicated in dotted lines in Fig. 2,) to which pail the bail-ear is secured by means of rivets inserted and headed down by my improved machine. Above the anvil a doubly-cranked driving-shaft 2 is mounted in boxes 3 3 therefor on the frame. A belt-pulley 4 is loose on the shaft. The rim of this belt-pulley is advisably made heavy, so as to serve the purpose of a steadying fly-wheel. A clutch member 5, Figs. 1, 2, 3, and 24, is fixed to and is preferably made a part of the hub of the wheel 4. The clutch member 5 has a circular laterally-projecting disk 6, which is provided in its face with one, and preferably two, (as shown,) segmental recesses 7 7. These recesses at their initial ends commence at the surface of the disk and increase in depth and at their terminal ends are lined or faced with steel seats 8 8, Figs. 22 and 24, for receiving thereon the thrust and bearing of pawls mounted on the other clutch member. The complementary clutch member 9, Figs. 1, 3, and 20, is keyed on the shaft 2 and is located adjacent to the clutch member 5. A pawl or pawls 10 10' (preferably two) are mounted in the clutch member 9 and are adapted to engage the clutch member 5 by contact with and bearing on the seats 8 8. These pawls 10 10' are located in recesses therefor in the face of the member 9, and the pawl 10 is rigid on a rock-shaft 11, also located in a recess therefor in the member 9, in which it is secured revolubly by means of straps 14 over the ends of the rock-shaft and secured in recesses therefor in the member 9 by screws. The rock-shaft 11 is also provided with a finger 12, Figs. 20 and 21, the free end of which takes into a recess therefor in the free extremity of the pawl 10'. Springs 13 13' are placed, respectively, behind the pawls 10 and 10' and are adapted to force the free ends of the pawls outwardly and into engagement with the seats 8 8 of the clutch member 5. By the oscillation of the rock-shaft 11 the pawls 10 and 10' may be withdrawn into the recesses therefor in the member 9 and out of engagement with the member 5. The pawl 10' is provided with laterally-projecting trunnions, by means of which it is pivoted in the member 9, being held in place by a plate 15 over the trunnions secured to the member 9. The rock-shaft 11 is also provided with a radial arm 16, which is substantially in the same radial plane from the rock-shaft with the pawl 10 and the finger 12 and lies in a recess therefor in the face of the clutch member 9 when the pawl 10 and the finger 12 are in their recesses in the member 9 and swings outwardly away from the face of the member 9 when the pawl 10 and the finger 12 swing outwardly actuated by the springs 13 and 13'. This arm 16 is located at a distance from the axis of the shaft 2 greater than the radius of the disk 6 on the member 5 and is in the path of the clutch-shifting head 17, Figs. 1, 3, 20, and 23, which head is fixed on a stem 18, mounted movably endwise in the frame and is held yieldingly upwardly in the path of the arm 16 by a spring 19, coiled about the stem and bearing downwardly against the frame and upwardly against a collar fixed on the stem. A rod 20 connects the stem 18 to a foot-pedal 21. By means of this construction the attendant may draw the clutch-shifting head 17 downwardly temporarily out of the path of the arm 16, permitting the pawls 10 10' to be thrown outwardly by the action of the springs 13 13', so as to engage the seats 8 8 on the clutch member 5.

A plunger 22, mounted reciprocably in vertical ways therefor in the frame, is connected by pitmen 23 23 to corresponding cranks on the shaft 2. A riveting-set head 24 is mounted reciprocable vertically centrally in the plunger 22 and is connected by a pitman 25 to a crank on the shaft 2, so disposed that the reciprocable movements of the head 24 follow at a little later time the reciprocable movements of the plunger 22. The plunger 22 at its lower extremity is provided with a terminal head 22', which head in its lower end face is provided with apertures adapted to receive and permit of the movement endwise therein of the riveting-sets 26 26, and when these sets are withdrawn upwardly the apertures are adapted to receive therein the stems of the rivets B B when being inserted in the pail and ear being affixed to the pail. This plunger 22, with its head 22', may properly be called the "plunger-die." The pitmen 23 25 are preferably made in two parts connected together by sleeve-like turnbuckles 27 27, whereby the lengths of the pitmen may be adjusted. Set-nuts 28 28, turning on the pitmen against the ends of the turnbuckles 27, lock them in place. The riveting-sets 26 are secured removably in their head 24 by means of inset holding-screws 29. The bodies 26' of the riveting-sets are preferably enlarged and made to bear movably against surfaces therefor on the inside of the head 22', whereby the riveting-sets are additionally supported at the period of active work.

The anvil 1 is provided with a steel face 30, secured to the anvil by a screw 31. A small plate or false anvil 32 is mounted at a little distance above the face of the anvil and below the plunger-die 22, the false anvil being provided with adjustable legs 33 33, which conveniently are in the form of screws that turn into the false anvil and extend downwardly through apertures therefor in the face 30 of the anvil, the feet of these legs, which, as shown, are the heads of the screws, bearing upwardly against the steel face and preventing the upward movement of the false anvil beyond the distance predetermined and to which the legs are adjusted. The feet of these legs are movable vertically in sockets therefor in the anvil. A spring 34, placed in a socket therefor in the anvil, acts upwardly against the false anvil 32 and holds it yieldingly in its elevated position. (Shown in Figs. 5, 8, and 11.)

Figures 4, 8:
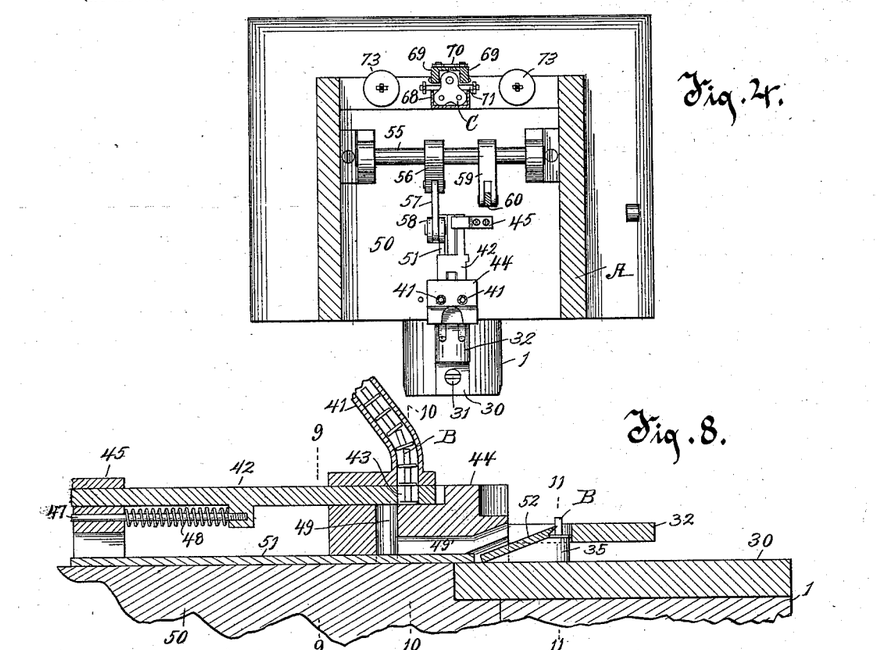
Fig. 4 is a horizontal section on line 4 4 of Fig. 1 looking downwardly.
Fig. 8 is a longitudinal vertical section of a part of the machine adjacent to and parallel with the section in Fig. 5.
Figure 11:
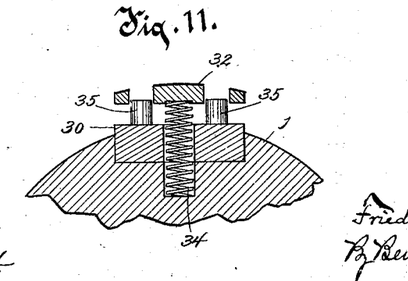
Fig. 11 is a section on line 11 11 of Fig. 8.

The anvil-face 30 is provided with rivet-supporting elevations 35 35, Figs. 5, 6, 7, 8, and 11, located adjacent and parallel to each other on the face 30, the front ends of which elevations are flat on top, Figs. 8 and 11, being thereby adapted to support the rivets B thereon while being inserted in the pail and ear and which elevations are inclined rearwardly downwardly to the surface of the face 30. Recesses are provided in the false anvil 32, in which these elevations 35 35 are received and which permit of the depressing of the false anvil 32 to a plane with or below the top surfaces of the elevations 35 35. The rearwardly-inclined surfaces of the elevations 35 form the bottoms of ways, and the side walls of the recesses in the false anvil 32 form the walls of the ways along which the rivets are pushed up to position on the flat front terminal top surfaces of the elevations 35 35, where they rest for insertion in the pail and ear.

Figures 12, 13, 14, 15, 16:
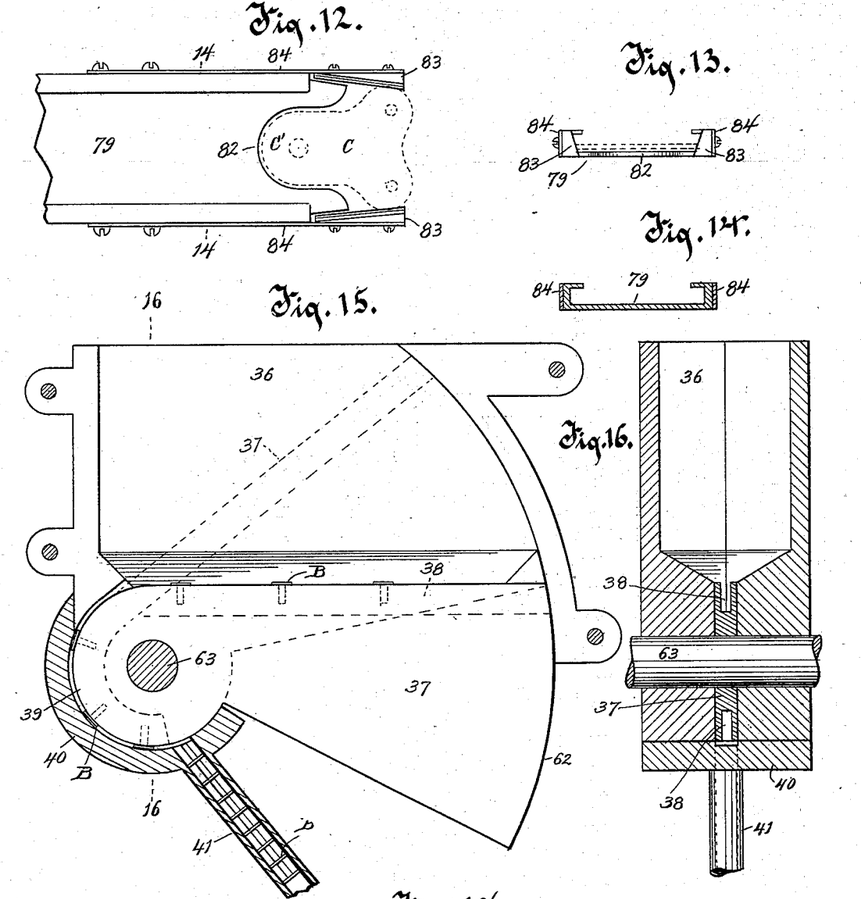
Fig. 12 is a plan of a fragment of the ear-chute and of the ear-holder.
Fig. 13 is an end view of the ear holder and chute.
Fig. 14 is a transverse section of the ear-chute on line 14 14 of Fig. 12.
Fig. 15 is a central vertical section of the rivet-hopper and feed mechanism.
Fig. 16 is a vertical section on line 16 16 of Fig. 15.

Hoppers 36, Figs. 2, 3, 15, and 16, are provided for holding supplies of rivets and delivering them to mechanism adapted to put the rivets in place for being inserted through the pail and the ear to be secured thereto. These hoppers 36 are conveniently made of two members secured together by bolts, and each hopper is provided with an elongated inclined bottom adapted to cause the rivets to move by gravity to the central elongated line of the bottom of the hopper. Along this central elongated line of the bottom of the hopper there is a tiltable arm or false bottom 37, which is pivoted in the hopper at one side and closes the bottom of the hopper, as shown in Figs. 15 and 16. This false bottom 37 has a straight edge normally forming the central elongated bottom of the hopper and thence continues in a curved direction around its pivot. This edge of the false bottom is provided with a channel 38 of such width and depth as adapts it to receive therein the stems of the rivets B, while the edge of the false bottom, both in that portion of it that is normally the bottom of the hopper and the continuation thereof in circular direction around its pivot, is adapted to receive and support thereon the heads of the rivets. The curved edge 39 of the false bottom is inclosed by the curved part 40 of the hopper, but at such distance therefrom as to permit of the free passage of the heads of the rivets B between the curved edge of the false bottom and the curved portion of the hopper, so that when the false bottom 37 is uptilted in the hoppers substantially to the extent indicated in the dotted line in Fig. 15 the rivets that have fallen on the edges of the false bottoms in the hoppers and whose stems have entered the channels therein will by gravity slide around the curved ends of the false bottoms to the tubular conveyers 41 41, Figs. 2 and 3, extending downwardly to a reciprocable plate 42, Figs. 2, 5, 6, 8, and 10, which is provided with vertical apertures 43, disposed to register initially with the discharging ends of the conveyers 41. The plate 42 is supported reciprocably on blocks 44 45, the furcate front extremities of the plate 42 being let into grooved ways therefor in the surface of the block 44. The plate 42 is provided medially with a downwardly-extending rib 46, which is provided with a guide-rod 47, extending rearwardly and passing movably through the block 45. An expanding spring 48, coiled about the rod 47 and bearing, respectively, against the rib 46 and the block 45, is adapted to hold the plate 42 yieldingly forward in its initial position. In this position the apertures 43 43 register with the lower ends or mouths of the conveyers 41 41. Just at the rear of the apertures 43 43 when the plate 42 is in its initial position (shown in Figs. 5, 6, and 8) there are vertical passages 49 49 from the plate 42 downwardly to other passages 49' 49', continuous therewith in a horizontal direction in the lower surface of the block 44. The block 44 is supported on a bed-plate 50, which is fixed to the frame and which is substantially a part of and continuous with the anvil 1. The steel face 30 of the anvil is flush with the surface of the bed-plate 50, Figs. 5 and 8. The top surface of the bed-plate and the top surface of the face of the anvil and the incline up the elevation 35 form the substantially-horizontal passage-ways 49' 49', along which the rivets are moved.

A rivet-pusher comprising a main member 51 and thereto-hinged pilot members 52 52 rests on the bed 50 and is reciprocable thereon. The pilot members 52 52 are provided at their rear extremities with ears 53 53, that are in alinement with and are secured by a pivot-pin to the ear 54 on the front end of the member 51. The pilot members 52 are disposed to travel in the passages 49' 49'. The front extremities of the members 52 52 are undercut from the upper surface downwardly and are provided near their lower surfaces with shoulders adapted to contact against the edges of the heads of the rivets B, and thus push them along, while the overhanging upper portion of the front edges of these members 52 are adapted to rest against the stems of the rivets, Figs. 6, 7, and 8.

Figures 2, 18, 22:
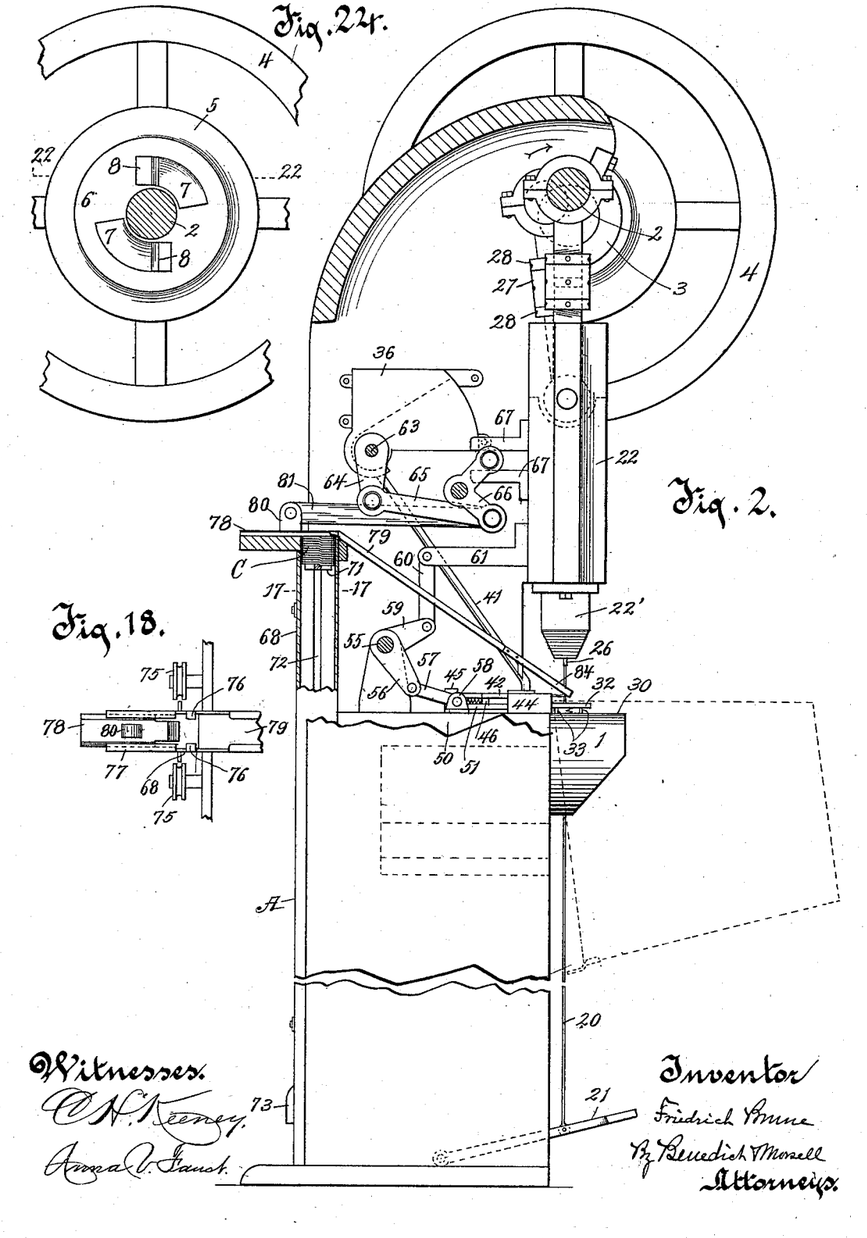
Fig. 2 is a view of that side of the machine at the left in Fig. 1, the upper portion being in section and parts being broken away for convenience of illustration.
Fig. 18 is a top plan view of feeding mechanism for delivering ears to the ear-chute.
Fig. 22 is a section on line 22 22 of Fig. 24.
Figures 3, 20, 21, 22, 23, 25:
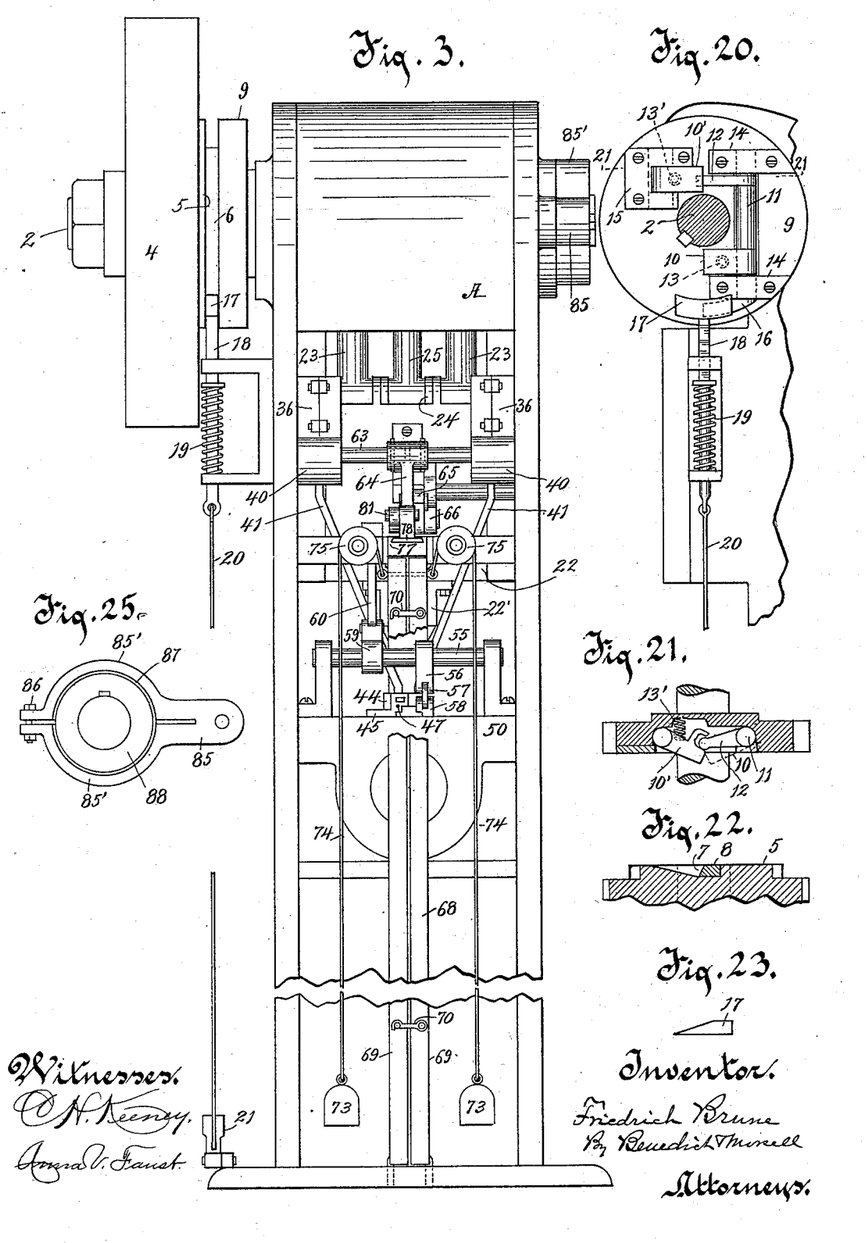
Fig. 3 is a rear elevation of the machine, parts being broken away for convenience of illustration.
Fig. 20 is a view of clutch mechanism, showing the face of one member of the clutch on the shaft that is shown in section.
Fig. 21 is a section on line 21 21 of Fig. 20.
Fig. 23 is a plan of a clutch device employed in the mechanism shown in Fig. 20.
Fig. 25 is a detail of a friction-clutch.

For reciprocating the rivet-pusher a rock-shaft 55, mounted in standards therefor fixed on the bed 50, is provided with a crank-arm 56, that is connected by a link 57 to a lug 58, fixed on the pusher-plate 51, and another crank-arm 59 on the rock-shaft 55, Figs. 2, 3, and 4, is connected by a link 60 to a stud 61, fixed on the plunger 22. The construction is such that as the plunger 22 goes down the rivet-pusher 51 is withdrawn rearwardly until the front ends of the pilots 52 52 are just at the rear of the vertical passages 49 49, and near the termination of the movement of the pusher 51 rearwardly the rib 46 is contacted by a shoulder 62, formed in the member 51, and thereby the plate 42 is also moved rearwardly with the pusher 51 to such extent as to bring the apertures 43 43 into registration with the passages 49 49 and permit the rivets in the apertures 43 to fall in the passages 49 49 to the bottom of the passages 49' in front of the pilots 22. Thereupon as the plunger 52 is elevated the rock-shaft 55 is oscillated in the other direction and the rivet-pusher forces the rivets along the passages 49' 49' to and up the inclines at the rear of the elevations 35 onto the flat tops of the front extremities of the elevations 35, the rivets then being in the positions shown singly in Fig. 8 and indicated in dotted lines in Fig. 5. The plate 42 is of a thickness equal to the length of the rivets, so that when the first rivets of the continuous lines of rivets coming down the conveyers 41 have entered the apertures 43 the succeeding rivets are just above the surface of the plate 42, so that as the plate 42 is withdrawn rearwardly to bring the rivets in the apertures 43 into registration with the passages 49 the lines of rivets in the conveyers 41 are prevented from advancing by the drawing of the plate 42 under the mouths of the conveyers, and thus closing them until the plate 42 is returned to its initial position, permitting the succeeding rivets to advance into the apertures 43.

It will be noted that the front or radially-distant edge 62 of the false bottom 37 is curved segmentally and fits to a corresponding curve of the front wall of the hopper 36; also, that the false bottom 37 is of considerable width vertically, so that the false bottom 37 is adapted to be uptilted to the extent indicated by dotted lines in Figs. 2 and 15, though constantly closing the bottom of the hopper in that direction, but so as to lift the rivets that have assumed an upright position in the channel 38 and on the edge of the false bottom and cause them to slide down the edge of the false bottom and around the circular way to the conveyer 41.

For uptilting the false bottoms 37 of the hoppers 36 with sufficient frequency to keep the conveyers 41 supplied with rivets the shaft 63, Figs. 2, 3, 15, and 16, which is rigid to the false bottoms, is provided with a crank-arm 64, that in turn is connected by a link 65 to one arm of a bell-crank 66, the other arm of which bell-crank is provided with a crank-pin located between and bearing against bearing-studs 67 67, fixed on the plunger 22. The construction is such that as the plunger 22 is elevated it causes the uptilting of the false bottom 37 in the manner and to the extent shown by dotted lines in Figs. 2 and 15.

Figure 5:
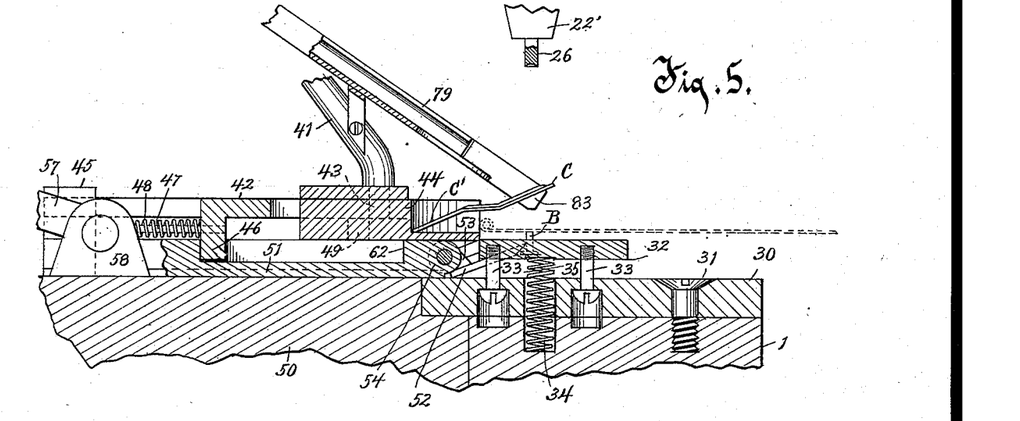
Fig. 5 is a central vertical section of the mechanism and devices employed immediately in and about the punching and riveting process.
Figure 6:
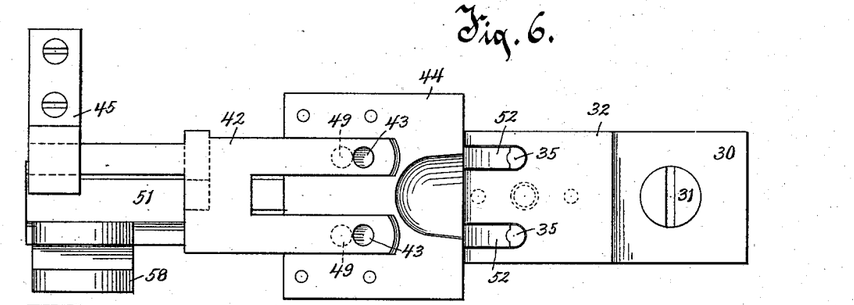
Fig. 6 is a plan of parts shown in section in Fig. 5, upper parts shown in Fig. 5 being omitted.
Figure 7:
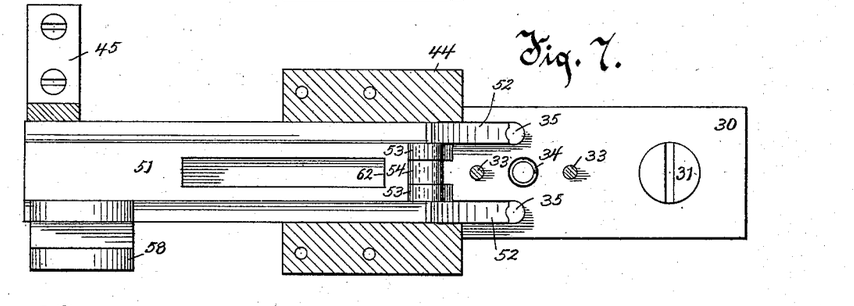
Fig. 7 is a plan of parts partially shown in Fig. 6, some parts shown in Fig. 6 being omitted, showing in Fig. 7 parts that are below the parts appearing at the front centrally in Fig. 6.
Figure 9:
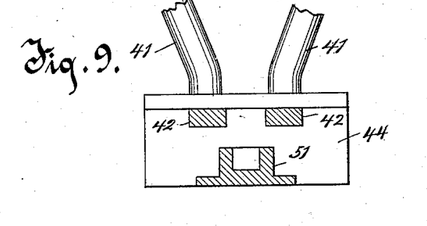
Fig. 9 is a section on line 9 9 of Fig. 8.
Figure 10:
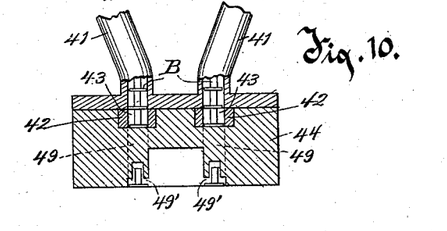
Fig. 10 is a section on line 10 10 of Fig. 8.
Figure 17:
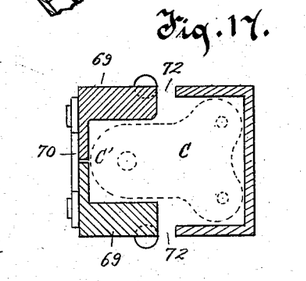
Fig. 17 is a transverse section of the ear-supply well on line 17 17 of Fig. 2.

When the rivets are in position on the elevations 35 35 and a pail, as indicated in dotted lines in Figs. 2 and 5, is placed in such relation thereto as to be adapted to have a bail-ear secured thereto by the rivets, the ear must be brought to a proper position with reference to the pail and opposite the rivets for the completion of the process. For this purpose I provide a well 68, Figs. 2, 3, and 17, secured to the frame in upright position, which is of a suitable size to receive therein, piled one on top of the other, a suitable supply of ears C C. The front walls of this well consist of two hinged members 69 69 or doors adapted to open medially, swinging outwardly from their abutting edges, and to close together and to be held in place conveniently by hooks 70 70. The form of this well in cross-section is such as to adapt it to receive loosely therein through the opened front side the ears C, Fig. 17, and hold them in position against lateral displacement. A false bottom or lifter 71 in this well is provided with eyes that project laterally through slots 72 72 therefor in the side walls of the well, and weights 73 73 are connected by cords 74 74, which run over idle pulleys 75 75, mounted on the frame, to the eyes fixed in the lifter, which eyes project through the slots 72 72. These weights are adapted to elevate the lifter 71 with its load of ears C thereon to the top of the well. At the top of the well there are inwardly-projecting guards 76 76, Fig. 18, that prevent the further advance upwardly of the ears C in the well. At one side of the top of the well there are horizontally-disposed ways 77, in which a movable slide 78 is reciprocable.

At the other side of the well there is a downwardly-inclined chute 79 for the passage of the ears. The construction is such that the slide 78, which is provided with a beveled front extremity, is adapted to slip under the top ear of the supply in the well and shove it off laterally into the chute 79, down which it passes by gravity. The slide 78 is provided with a stud 80, which is connected by a rod 81 to the crank-pin on one arm of the bell-crank 66. The construction is such that as the plunger 22 goes up it forces the slide 78 under and against the top ear of the supply in the well and pushes it over into the chute 79. The chute 79 is provided with side walls and overturned top edges of such form and size as are adapted to hold the ears C in substantially the position while they descend in the chute that they are received from the well. The ears are so elongated in one direction that they cannot swing around laterally to any improper extent while descending the chute.

The bottom of the chute at its discharging end is cut in a concave form, (seen at 82 in Fig. 12,) which form corresponds with the contour of the end of the ear at the rear as it descends. A little beyond this cut-out portion of the bottom of the chute are located gripping devices 83 83. These gripping devices consist of oppositely-disposed longitudinally-inclined and vertically-beveled blocks fixed on the extremities of flat springs 84 84, that are secured to the side walls of the chute 79. The construction of these gripping devices is such that the ear C as it comes thereto contacts at the opposite edges of its broadest part with the inclined and beveled walls of the devices 83, and is thereby held lightly, but so as to permit the smaller upper extremity C' of the ear to drop down into a corresponding recess therefor in the front end of the block 44, Fig. 5, and be held in this position until pushed therefrom downwardly by the plunger-die as it comes down thereon, causing it to fall onto the surface of the pail in position for receiving therethrough the rivets standing on the anvil-elevations 35. The recess in the block 44, in which the upper portion of the ear is received, is of such size and shape as to hold the ear C in position for the riveting process. As the plunger-die 22 22' comes down the riveting-sets 26 are withdrawn up into the face of the die, and the die coming down onto the ear C forces the ear and the wall of the pail down onto the rivets, causing them to serve as punches and to punch their way through the wall of the pail and up through the apertures therefor in the ear C, at the same time carrying the wall of the pail down onto the false anvil 32 and pushing this down with the pail and ear until the heads of the rivets are set against the inner surface of the wall of the pail, and thereupon while in this position the riveting-sets 26 come down onto the ends of the stems of the rivets and upset them, thus heading them down on and against the outer surface of the ear C.

It will be noted that the movements of the machine are controlled by the attendant, so far as starting it is concerned, by and through the pedal 21. It is also desirable to have the machine so controlled that it will promptly stop and not continue to move by mere momentum. For this purpose I provide a brake device, Figs. 1, 3, and 25, consisting of an arm 85, pivoted on the frame and provided with an enlarged split extremity, the fingers 85' 85' being severally in semicircular form and secured together at their outer extremities by a clamping-bolt 86. These curved furcate fingers 85' are lined with leather 87, which bears frictionally on a cylindrical hub 88, splined on the shaft 2. This brake device by means of the bolt 86 is made to bear on the hub 88 with such tightness as to quickly stop the rotation of the shaft when not actuated by the positive force of the driving medium.

What I claim as my invention is—

1. A punching and riveting machine, comprising an anvil for supporting rivets and the utensil to be riveted to, a plunger-die adapted to force a utensil upon the rivets as punches, rivet-sets movable with and in the plunger-die in apertures therefor in the plunger-die adapted to receive the rivets when the rivet-sets are withdrawn, means for delivering ears in proper position to be secured to the utensil, and means for placing rivets in position for punching the utensil and for insertion in the ear, the construction being adapted to force the rivets through the utensil and to upset the rivets at a single reciprocation of the plunger-die and the rivet-sets.

2. In a punching and riveting machine, an anvil, an elevated rivet-support on the anvil, on which support the rivet rests before and while being inserted in and riveted to the utensil, a movable false anvil above the anvil alongside the elevated rivet-support, and a movable plunger-die adapted to force the wall of a utensil down with the false anvil and about the rivet as a punch up through the utensil and into the die.

3. In a punching and riveting machine, an anvil, an elevated rivet-support on the anvil, a rivet passage or way leading to the elevated rivet-support, means adapted to push the rivet along the way to the elevated support, and a movable plunger-die adapted to force the wall of a utensil down about the rivet as a punch, the rivet passing through the utensil and into the die.

4. In a punching and riveting machine, an anvil, an elevated rivet-support on the anvil, a rivet passage or way leading to the elevated rivet-support, a reciprocable rivet-pusher located in the rivet-way, means for reciprocating the pusher and a movable plunger-die adapted to force the wall of a utensil down about the rivet as a punch.

5. In a punching and riveting machine, a reciprocable plunger-die, an anvil, an elevated rivet-support on the anvil, a horizontal and upwardly-inclined rivet passage-way leading to the elevated rivet-support, a pusher in the rivet-way provided with a hinged pilot, and a rock-shaft connected by one crank to the pusher and by another crank to said plunger-die.

6. A rivet holding and delivering hopper, comprising a receptacle having walls inclined downwardly to an elongated uptiltable bottom, said uptiltable bottom being pivoted near one end and being provided with a rivet-channel along its edge that forms a bottom to the hopper, said edge and channel continuing therefrom in a curve about the hub or end of the uptiltable bottom in a substantially-semicircular course concentrically around its pivotal axis to a place of discharge of the rivets, said channel being of a size and form adapted to receive the stems of rivets therein while the rivet-heads are on the edge of the uptiltable bottom, and a portion of the hopper adjacent to and about the hub or curved part of the channel edge of the uptiltable bottom at a constant distance therefrom forming therewith a way for the bearing and travel of rivets partially around the axis of the uptiltable bottom and concentrically therewith to the place of discharge, the construction being such that the rivets in the hub or curved edge of the uptiltable bottom are overturned and advanced to the place of discharge by frictional contact with the oscillating bottom.

7. In a punching and riveting machine, a means for oscillating an uptiltable rivet-carrying and rivet-moving hopper-bottom, comprising the uptiltable bottom in the hopper, a shaft fixed to and serving as the pivot of the uptiltable bottom, a crank-arm on the shaft, a bell-crank pivoted on a fixed support one arm of which bell-crank is connected to the crank-arm on the shaft, and a vertically-reciprocable plunger provided with horizontal ways, in which a wrist-pin on one arm of the bell-crank rides.

8. In a riveting-machine, the combination with a reciprocable rivet-holding plate provided with a rib, of a spring adapted to hold the plate to initial position, and a reciprocating rivet-pusher provided with a shoulder adapted near the close of the movement of the pusher in one direction to engage the reciprocable rivet-plate and shift it temporarily from its initial position.

9. In a machine for securing bail-ears to utensils, an ear-holding well, a lifter in the well adapted to elevate ears therein and deliver them at the top to an ear-chute extending downwardly from the top of the well, a slide in ways reciprocable to and across the top of the well adapted to push an ear from the well into the chute, a bell-crank one arm of which is connected to said slide and the other arm of which rides in horizontal ways fixed on a vertically-reciprocating plunger.

10. An ear-manipulating device, comprising a bail-ear chute having its bottom at the discharging end cut out to the contour of the upper portion of the bail-ear, inclined and beveled blocks at the end of the chute, the blocks being on springs secured to the chute and being adapted to catch and hold the forward end of the ear and permit the rear upper end thereof to fall to a seat below the chute.

11. The combination with a bail-ear chute having its bottom at the discharging end cut out to the contour of the upper portion of the bail-ear, inclined and beveled blocks at the end of the chute the blocks being on springs secured to the chute and being adapted to catch and hold the forward end of the bail-ear and permit the rear upper end thereof to fall to a seat below the chute, and a block below the end of the chute, said block being provided with a recess or socket in its top and end adapted to receive the end of the ear therein on a seat as that end of the ear falls from the chute, and to hold it against lateral displacement.

12. The combination of an anvil having elevated rivet-supports thereon, a block adjacent to the rivet-supports provided with a bail-ear-holding recess, a bail-ear chute provided at its discharging end with bail-ear-holding devices substantially above the rivet-supports, and reciprocable rivet-sets above the ear-holding terminal blocks of the chute adapted to upset the rivets after they are pushed upwardly through the ear.

13. In a punching and riveting machine, a reciprocable plunger-die 22 provided with interior longitudinal ways and rivet-set openings in its forward end, adapted to receive rivets therein when the rivet-sets are withdrawn, a riveting-set head 24 reciprocable on the ways in the plunger-die, riveting-sets 26 secured detachably in the forward end of the riveting-set head and passing movably through and guided by the forward ends of the plunger-die, and means for projecting the riveting-sets from and withdrawing them into the plunger-die while the plunger-die is reciprocating.

In testimony whereof I affix my signature in presence of two witnesses.

FRIEDRICH BRUNE.

Witnesses:
 C. T. BENEDICT,
 C. H. KEENEY.